United States Patent [19]
Bokinge

[11] Patent Number: 5,978,471
[45] Date of Patent: Nov. 2, 1999

[54] METHOD AND DEVICE FOR DETECTING A RINGTRIP

[75] Inventor: Bo Bokinge, Bromma, Sweden

[73] Assignee: Telefonaktiebolaget LM Ericsson, Stockholm, Sweden

[21] Appl. No.: 08/987,767

[22] Filed: Dec. 9, 1997

[51] Int. Cl.[6] .................................................. H04M 3/06
[52] U.S. Cl. ........................... 379/382; 379/373; 379/377
[58] Field of Search .................................... 379/382, 377, 379/252, 412, 413, 418, 373, 350

[56] References Cited

U.S. PATENT DOCUMENTS

| | | | |
|---|---|---|---|
| 4,110,569 | 8/1978 | Schindler et al. | 379/382 |
| 4,132,864 | 1/1979 | Feng | 379/377 |
| 4,304,970 | 12/1981 | Fahey et al. | 379/377 |
| 4,477,698 | 10/1984 | Szlam et al. | 379/377 |
| 4,540,853 | 9/1985 | Albouy | 379/378 |
| 4,731,828 | 3/1988 | Basehore | 379/382 |
| 5,402,482 | 3/1995 | Minohara et al. | 379/377 |

FOREIGN PATENT DOCUMENTS 0 116 291   8/1984   European Pat. Off. .

*Primary Examiner*—Forester W. Isen
*Assistant Examiner*—Jacques M. Saint-Surin
*Attorney, Agent, or Firm*—Burns, Doane, Swecker & Mathis, L.L.P.

[57] ABSTRACT

A ringtrip detector comprises a reference counter for controlling a battery current generator, which shapes the ring signal, a zero pass detector for detecting zero passes in a voltage at a node, which is proportional to the telephone line current and two other counters. The zero passes of the voltage create a pulse at both the positive and the negative zero crossing of the zero pass detector. The reference counter is gated into a memory, when these pulses appear. The zero passing of the previous and the present ring cycle are stored in the memory. A counter decides the difference between the previous and the present ring cycles zero passes. If the zero pass difference between the present and previous ring cycles is greater than a fixed value, the output will indicate a "phase difference" and if it is less than the fixed value it will indicate "no phase difference". Another counter counts a predetermined number of successive ring cycles with "no phase difference" at the start of a ring burst signal, and after establishing the ring burst signal, another predetermined number of successive ring cycles with "phase difference" is counted to detect the ringtrip.

6 Claims, 3 Drawing Sheets

METHOD AND DEVICE FOR DETECTING A RINGTRIP

FIELD OF THE INVENTION

The present invention is related to a method for detecting a ringtrip in a line circuit and a device for detecting a ringtrip in a line circuit. With ringtrip detection means the detection of the change of the on-hook status to the off-hook status, when ring signals are effected. The line circuit controls and drives the ring signal to the telephone lines. The line circuit also sets the DC line characteristics, such as the apparent battery voltage, the line feed impedance and the current limitation. One of the main functions of the line circuit is to provide a ring signal to the connected telephone. There may be one loop that supports this function and controls the DC voltage between two subscriber line wires.

BACKGROUND OF THE INVENTION

The cited DC loop may also include the telephone and may control as mentioned earlier the DC voltage between the two subscriber line wires too.

The DC loop may therefore often provide the following functions:

Sets the subscriber line current feed characteristics

Generates the ring signal

Senses the ring signal

Detects the ringtrip

Detects the loop

The DC loop also determines the internal battery and the DC feed resistance to the line.

The DC feed characteristic is determined by sensing the line voltage and then the DC loop controls the line current through the loop. In FIG. 1 a simplified diagram of the DC loop is shown during a ring burst mode.

The line current $I_L$ has the following equation:

$$I_L = \frac{GR}{RDC} \cdot R_1 \cdot (-U_L gm + I_{bat}) \frac{1}{\left(1 + \frac{S}{\omega_1}\right)} \quad (1)$$

From the expression above, the output impedance of the circuit towards the line becomes:

$$Z_F = -\frac{\partial U_L}{\partial I_L} = \frac{RDC}{gmR_1 GR}\left(1 + \frac{s}{\omega_1}\right) \quad (2)$$

where $I_L$=line current $U_L$=line voltage (voltage difference between A- and B-wire)

$Z_F$=line feed impedance,

ω=pole corner frequency, 1,5 Hz DC-loop filter, alternatively

170 Hz in ring burst mode,

GR=line current is GR times the current through RDC,

RDC=external resistor, $R_1$=internal resistor sets line feed impedance, $I_{bat}$=current generator and gm=transconductance factor The internal battery voltage is determined by the current generator Ibat and the transconductance factor gm.

$$Ubat = \frac{1}{gm} I_{bat}$$

The current generator Ibat is constant in all the modes except the ring burst mode.

During the ring burst mode, when the ring signal is on, the ring signal is superimposed on the internal battery voltage. This voltage is generated by a constant current. The ring signal is achieved by superimposing an AC-current on the constant current. The current generator Ibat shapes thus the ring signal and the battery voltage may form a square ring signal as in FIG. 2.

SUMMARY OF THE INVENTION

For detecting a ringtrip a ringtrip detector senses first the on-hook status of the load of a telephone circuit by comparing the value of the zero passing and sensing the change of the load during off-hook. During the on-hook status the ring signal has no DC component, but during the off-hook status the ringtrip detector even involves the measuring of the DC component.

A high frequency master clock oscillator with a much higher frequency than that of the ring signal is used. The master clock is divided by a counter so that the counter cycle corresponds to the ring signal. The counter controls a SC-filter, which shapes the ring signal form and steers the battery current generator. The counter is used as a reference.

The on and off hook detection is accomplished by sensing a voltage at a node in the DC loop, which is proportional to the DC line current. The zero passes of this voltage create a pulse at both the positive and the negative zero crossing of the zero pass detector. The counter is gated into a memory, when this pulse appears. The zero passing of the previous and the present ring cycle are stored in the memory. A counter decides the difference between the previous and the present ring cycles zero passes. The ringtrip detector is also equipped with another counter, which determines both zero passes established by a number of successive "no phase difference" ring cycles.

The ringtrip detector comprises a reference counter, which controls the battery current generator, a zero pass detector and two other counters. The first counter decides the difference between the previous and the present ring cycles zero passes. The second counter counts the number of successive ring cycles with "no phase difference" or "phase difference" dependent on which mode the ringtrip detector operates in. After the zero passes of the ring signal are established, the counter changes mode and counts "phase difference". At the end of this predetermined number of ring cycles with "phase difference", the ringtrip detector detects ringtrip.

This is a digital measurement of the phase, where both the positive and the negative zero passes are detected. The detecting of the ringtrip must be done rapidly, the decision must be executed after the first changed ring cycle.

DESCRIPTION OF A PREFERRED EMBODIMENT

Figure 1:
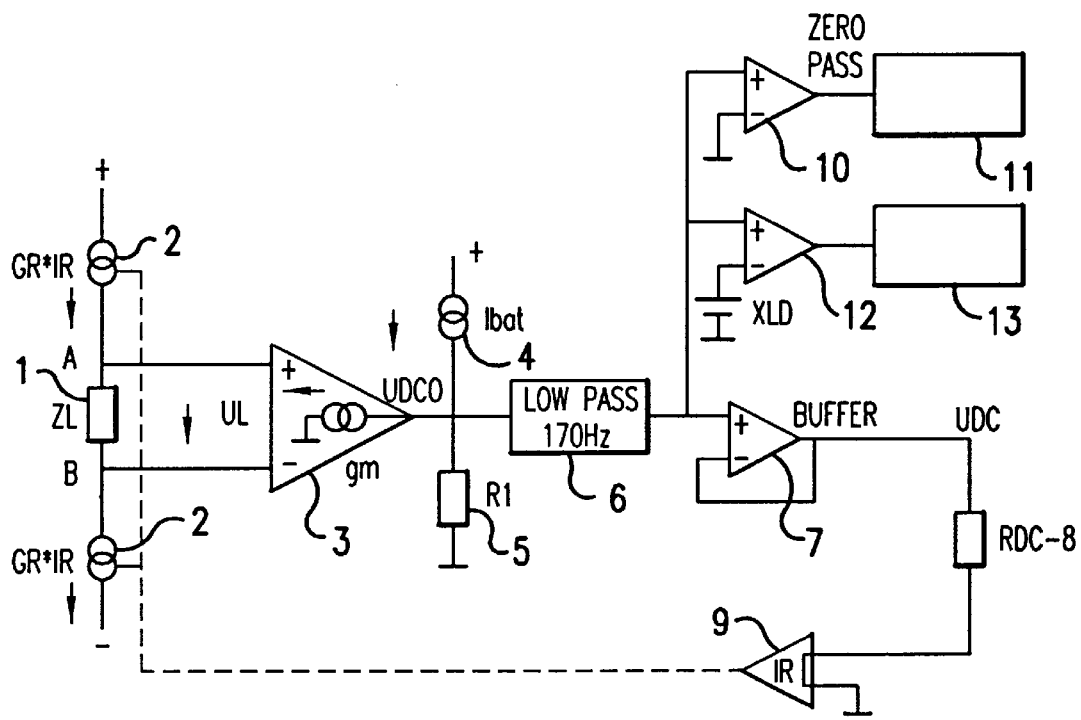
FIG. 1 is a simplified diagram of the DC loop in ring burst mode.
Figure 2:
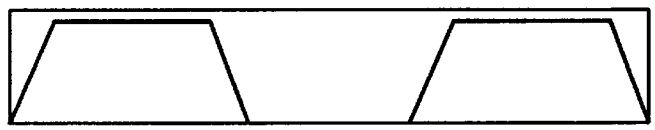
FIG. 2 is a simplified ring signal graph.

FIG. 1 shows a line load ZL 1 connected by A and B wires. The line voltage $U_L$ on the two wires is sensed by a transconductance amplifier 3 and converts it to a current, that should be sinked from an UDCO node. The battery current generator, $I_{BAT}$ 4, sources current into the UDCO. The internal resistor $R_1$ 5 sets the line feed impedance. A low pass filter 6 between the node UDCO and a buffer 7 before an UDC output prevents the speech signal from influencing the DC feed characteristics. The filtered UDCO is compared with an analog ground by a comparator 10. The zero passes are sensed by a ring trip detector 11. The filtered UDCO is also compared with a threshold value by a comparator 12 and a ring current detector 13 detects if the line current exceeds a certain value, XLD. The UDC is connected to a resistor 8, which decides the current, $I_R$ to analogue ground, via a current sense amplifier 9. The current, $I_R$, is amplified by a factor GR 2 before it is sent to the subscriber line.

The voltage at the node UDCO is proportional to the line current. The line current has the same phase as the voltage at the node UDCO. There is a phase difference between the current Ibat and the voltage UDCO, dependent on the load of the line.

In a ring burst mode, there is an AC-load on the line. The signal UDCO will be symmetric around analog ground, the duty cycle is 50%. When the hook goes off the load becomes a DC-load and the duty cycle of the signal UDCO will be greater than 50%. While the hook changes status, the phase difference between the current Ibat and the voltage UDCO will be changed. The ringtrip detector 11 senses the zero passes and detects a change, which becomes a ringtrip.

Figure 3:
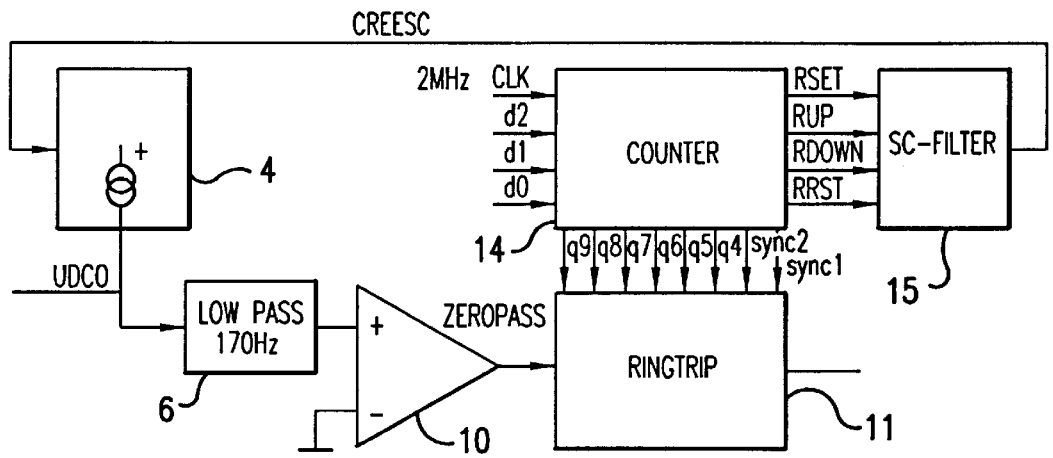
FIG. 3 is a diagram showing the function blocks of a ringtrip detection according to the invention.

FIG. 3 shows that the Ibat generator 4 is controlled by an input voltage CREFSC and its value is proportional to this input voltage, zero volt gives zero current and an analog ground gives maximum current. A counter 14 and a SC-filter 15 achieve a controlling voltage to the Ibat generator.

The SC-filter 15 is controlled by the counter 14, which sends signals to the SC-filter to increase, decrease or set the output voltage.

The counter cycle is divided into the following modes:

SC-filter steps up the output voltage.
SC-filter sets the output voltage to a maximum value.
SC-filter steps down the output voltage.
SC-filter sets the output voltage to a minimum value.

Each mode has an output signal to control the switch capacitor filter: RUP, RSET, RDOWN and RRST.

The input clock, 2 Mhz, is divided by the counter 14, so that the counter cycle corresponds to the ring signal cycle. The counter is used as a reference. The outputs from the reference counter 14, q9-q4 show the position of the ring cycle. The ring cycle is controlled by the inputs d2, d1, d0 from a device processor, which sets the ring signal on or off.

The ringtrip detector 11 is provided with the outputs q9-q4 of the reference counter 14 and the output from the comparator 10, which feeds zero passing. When the ringtrip detector has indicated a ring trip, the output sets active and passes to the device processor.

Figure 4:
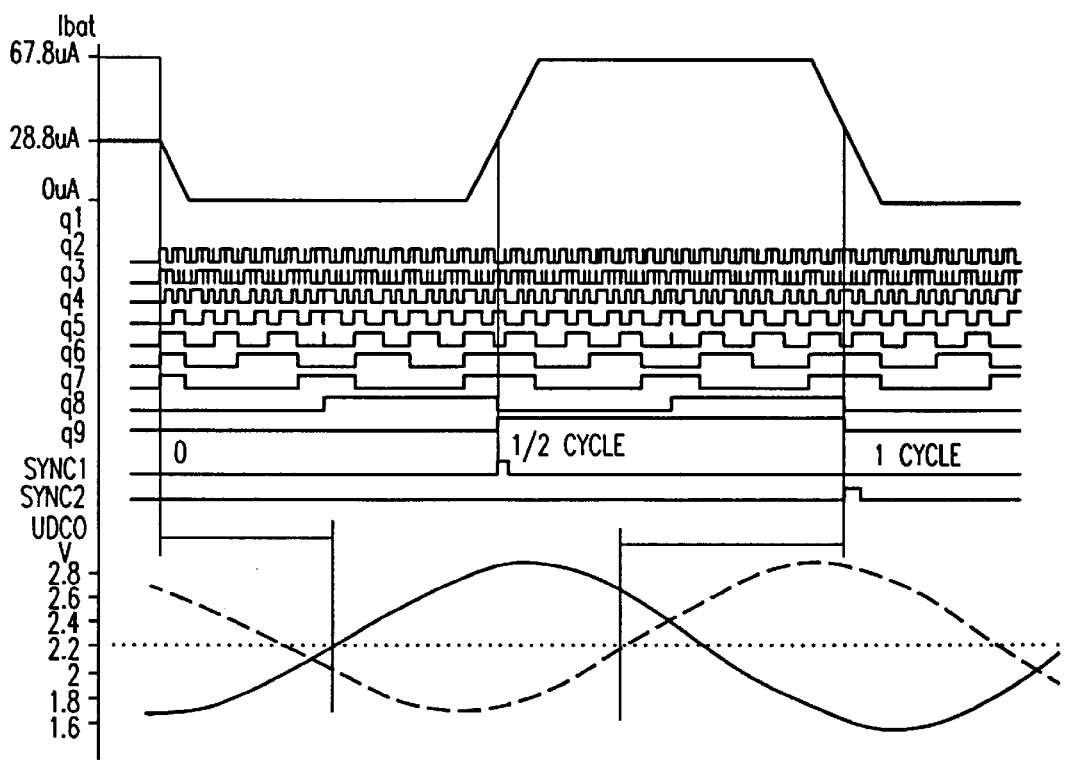
FIG. 4 is a diagram showing the relationship of the phase between the Ibat generator and the current of the line.

FIG. 4 shows the battery current wave form, Ibat, creating a ring signal on the line wires A and B. The digital signals q9-q4 represent the outputs of the reference counter of the battery current generator. Its purpose is to steer the battery current. The signal sync 1 is used for the positive zero passes and sync2 respectively for the negative zero passes. These signals from the reference counter are used to reset the counters and load the previous counter value into a memory. UDCO is an internal node of the DC loop, its phase relative to the battery current generator is response to the load of the line. The continuous line shows −90 degrees phase respectively +90 degrees for the dotted line. These lines show the maximum variation of the phase shift. The current Ibat is a reference to measure the zero passes of the line current.

When the UDCO signal, which corresponds to the line current, is passing the analog ground, the zero pass relative to the reference current Ibat is sensed. There is a digital measurement of the zero pass relative to Ibat. The outputs of the reference counter to Ibat will be loaded into registers, when UDCO is passing the analog ground, both at the negative and the positive zero passing.

Figure 5:
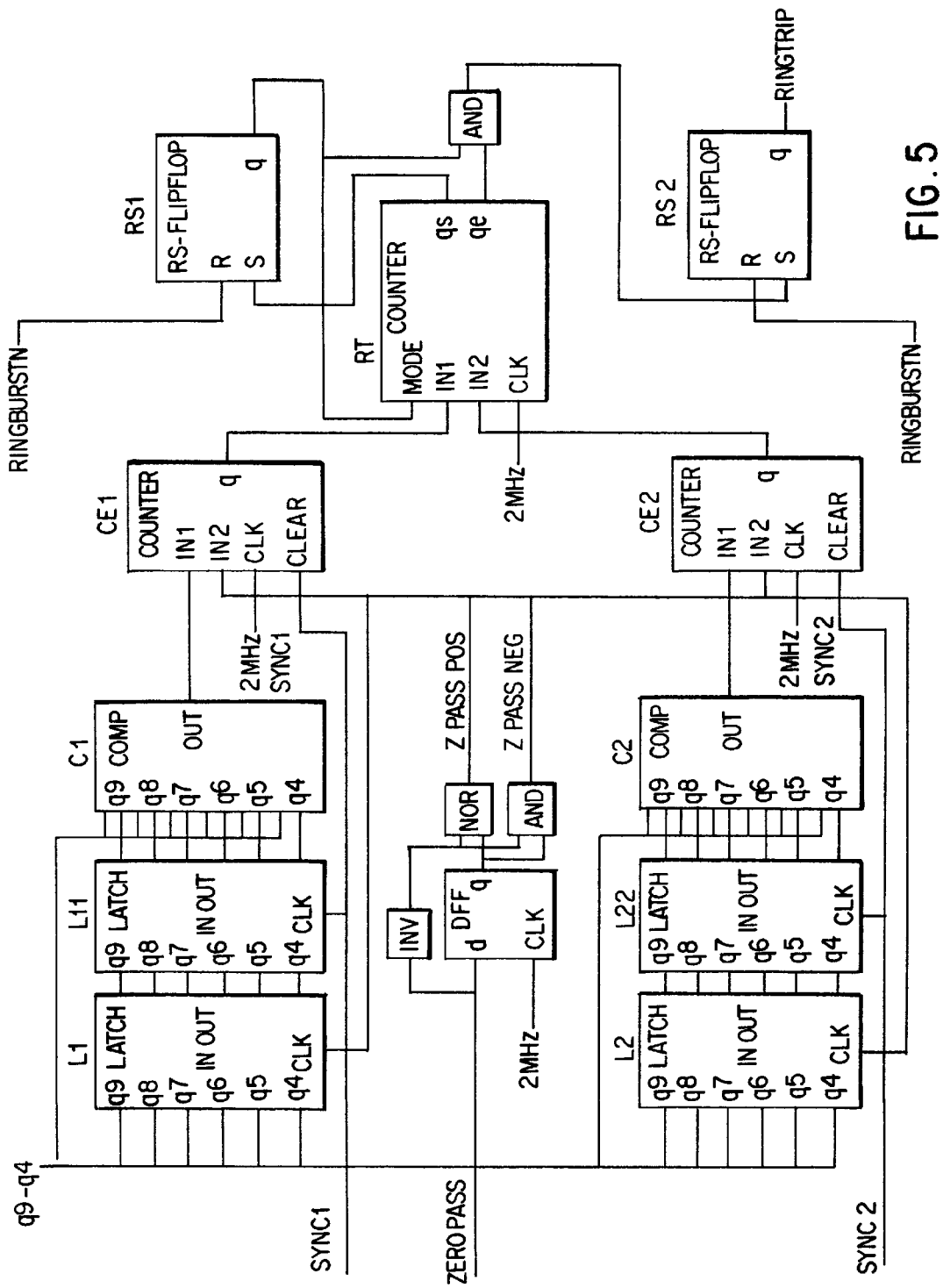
FIG. 5 is a diagram showing the cells of the ringtrip detector according to the invention.

FIG. 5 shows the ringtrip detector 11 in greater detail. The output signal ZEROPASS from the comparator 10 is connected to the D-flipflop DFF, which is clocked by 2 Mhz signal and connected to the inverter INV. The outputs of the inverter and the D-flipflop are connected to a NOR gate and to a AND gate, which create a pulse at the positive zero pass ZPASSPOS respectively a pulse at the negative zero pass ZPASSNEG.

The latches L1 and L2 load the outputs of the reference counter, which controls the battery current generator, when the pulse for the positive zero pass respectively the pulse for the negative zero pass appear during the present ring cycle. The phase of the signal UDCO can be up to +/−90 degrees relative to the battery current Ibat dependent on the line load. The sync signal SYNC1 respectively SYNC2, which are 180 degrees to the battery current, loads the outputs of latch L1 to latch L11 respectively the outputs of latch L2 to latch L22. When the sync signal appears a new ring cycle is started and the latches L11 and L22 store the outputs of the reference counter of the previous ring cycle for the positive zero pass respectively the negative zero pass. The outputs of the latches L11 and L22 are connected to each digital comparator C1 and C2. When the reference counter passes the values of the previous ring cycle, another pulse appears at the output of the digital comparators C1 and C2. The difference of the zero passes between the previous and the present ring cycles is measured by the counter CE1 for the positive zero passes respectively the counter CE2 for the negative zero passes. The first zero pass of the present or the previous ring cycles starts the counter CE1 and the last zero pass stops the counter CE1 for the positive zero passes and respectively CE2 for the negative zero passes. If the zero pass difference between the present and the previous ring cycles is greater than a fixed value, the output will indicate a "phase difference" and if it is less than the fixed value it will indicate "no phase difference". The SYNC1 signal clears the counter CE1 and the SYNC2 signal clears the counter CE2 at each ring cycle.

During each ring cycle, the zero passes relative to the battery current Ibat will be measured at both the positive and the negative zero passing. It is enough that one of these measurements shows phase difference, so that this cycle indicates phase difference to counter RT. The outputs of the counters CE1 and CE2 are connected to a counter RT. The mode input of this counter is connected to the output of an RS-flipflop RS1, the R input of the RS-flipflop is connected to the RINGBURSTN signal, which resets the RS-flipflop at the start of the ring burst signal, when the RS-flipflop is cleared, the qs output of the counter RT goes high, when a predetermined successive number of "no phase difference"

zero passes has been reached. The ring signal zero passes are established and the counter RT counts successive "phase difference" cycles. When the counter has reached another predetermined value, the output qe of the counter goes high. The output qe is connected to another RS-flipflop RS2, which sets high. The circuit send a ringtip message to the device processor. Before the circuit is set to the ring burst mode, the RS-flipflop RS1 and RS2 are cleared by a RING-BURSTN signal.

While the foregoing description includes numerous details and specificities, it is to be understood that these are merely illustrative of the present invention, and are not to be construed as limitations. Many modifications will be readily apparent to those skilled in the art which do not depart from the spirit and scope of the invention, as defined by the appended claims and their legal equivalence.

I claim:

1. A method for detecting a ringtrip, wherein a ringtrip detector comprises a reference counter, which controls a battery current generator, a zero pass detector, means for detecting zero passes in a voltage signal proportional to a line current, and two other counters, characterized by deciding a difference of the zero passes between previous and present ring cycles relative the reference counter, counting a number of successive ring cycles with "no phase difference" at the start of a ring burst signal, and after establishing the ring burst signal, the number of successive ring cycles with "phase difference" is counted to detect the ringtrip.

2. An apparatus for detecting a ringtrip, wherein a ringtrip detector comprises a reference counter, which controls a battery current generator, a zero pass detector, means for detecting zero passes in a voltage signal proportional to a line current, and two other counters, characterized in that a zero pass detector means is constituted by a comparator circuit (10) having a positive input connected to ground, a negative input connected to receive a voltage signal proportional to the line current and an output connected to a logic, wherein a pulse is created at the positive zero passes and the outputs of a reference counter (14) is stored in a memory, when the pulse appears, in that the memory is provided to store outputs of the reference counter of the previous and the present ring cycles, in that when the reference counter (14) passes a value of the previous ring cycle another pulse is provided to appear, wherein these pulses are connected to a counter (CE1) deciding if the difference of the positive zero passes between the previous and the present ring cycles has reached a threshold value, and a signal indicating if the positive zero pass is changed in the present ring cycle, in that the logic is provided to create also another pulse at the negative zero pass, where the difference of the negative zero passes between the previous and the present ring cycles decides in the same way as the positive zero passes and another signal indicates, if the negative zero pass is changed in the present ring cycle, wherein these signals, which indicate if the negative or the positive zero passes are changed in the present ring cycle, are connected to a third counter (RT), the mode of this counter is cleared at the start of the ring burst signal, when the predetermined successive number of "no phase difference" zero passes has been reached, the mode of the counter is set and the ring burst signal is established, when the predetermined successive number of "phase difference" zero passes has been reached, the ringtrip is detected.

3. An apparatus according to claim 2, characterized in that a zero pass detector means is constituted by a comparator circuit(10) having a positive input connected to a ground, a negative input connected to receive a voltage signal proportional to the line current and an output connected to a D-flipflop (DFF), which is provided to be clocked by a 2 Mhz signal and connected to the input of an inverter (INV), the output is connected to one input of an AND-gate and to one input of a NOR-gate, the output of the D-flipflop is connected to the other input of the AND-gate and the NOR-gate, the output of the said NOR-gate is provided to create a pulse at the positive zero passes, and the output of the said AND-gate is provided to create another pulse at the negative zero passes, wherein these pulses store the outputs of the reference counter into each individual latch.

4. An apparatus according to claim 2, characterized in that one counter (CE1) is provided to decide if the difference of the positive zero passes between the previous and the present ring cycles has exceeded a threshold value, when the pulse at the positive zero pass appears, in that the outputs of the reference counter (14) are provided to be stored in a latch L1, when a sync signal of the positive zero passes appears, in that the outputs of the latch (L1) are provided to be stored in another latch (L11), storing the outputs of the reference counter for the previous ring cycles, wherein these outputs are connected to a digital comparator (C1), in that the other inputs of the comparator (C1) are connected to the outputs of the reference counter (14), in that the output of the digital comparator is provided to create another pulse, when the reference counter (14) passes the value of the positive zero pass in the previous ring cycle and the counter (CE1) decides if the difference of the positive zero passes between the previous and the present ring cycles has reached the threshold value and determines if the phase is changed in the present ring cycle and in that another counter (CE2) is provided to decide if the negative zero pass of the present ring cycle is changed in the same way as the positive zero pass is changed, wherein these counters indicate "no phase difference", or "phase difference".

5. An apparatus according to claim 2, counting a number of successive ring cycles with "no phase difference" at the start of the ring burst signal, and after establishing the ring burst signal, counting another number of successive ring cycles with "phase difference", characterized by a counter (RT), wherein a mode input of this counter (RT) is cleared at the start of the ring burst signal, when a predetermined successive number of "no phase difference" ring cycles has been counted and in that the mode of the counter is provided to be set, when another predetermined successive number of "phase difference" ring cycles has been counted and the ring trip is provided to be detected.

6. An apparatus according to claim 5, counting a number of successive ring cycles with "no phase difference" at the start of the ring burst signal, and after establishing the ring burst signal, counting another number of successive ring cycles with "phase difference", characterized in that a counter (RT) is provided to be clocked by a 2 Mhz signal, where the mode input of this counter (RT) is connected to the output of an RS-flipflop, an R input of the RS-flipflop (RS1) is connected to a RINGBURSTN signal, which resets the RS-flipflop at the start of the ring burst signal, in that an output qs of the counter (RT) is connected to the S input of the RS-flipflop (RS1), when a predetermined successive number of "no phase difference" zero passes has been reached, the output qs of the counter (RT) is provided to go high and the mode of the counter is changed, when another predetermined successive number of "phase difference" zero passes has been reached, the output qe of the counter is provided to go high, wherein the output is connected to one input of an AND-gate, the other input of the AND-gate is connected to the output of the said RS-flipflop (RS1), in that the output of the AND-gate is provided to be connected to the S input of another RS-flipflop (RS2), and the R input of this RS-flipflop (RS2) is provided to be connected to the RINGBURSTN signal, which resets the RS-flipflop (RS2) at the start of the ring burst signal, and the output of this RS-flipflop (RS2) goes high and the ringtrip is detected.

* * * * *